(12) United States Patent
Hirabayashi (10) Patent No.: US 9,343,985 B2
(45) Date of Patent: May 17, 2016

(54) POWER SUPPLY APPARATUS AND IMAGE FORMING APPARATUS

(71) Applicant: CANON KABUSHIKI KAISHA, Tokyo (JP)

(72) Inventor: Jun Hirabayashi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 129 days.

(21) Appl. No.: 14/226,625

(22) Filed: Mar. 26, 2014

(65) Prior Publication Data

US 2014/0301117 A1 Oct. 9, 2014

(30) Foreign Application Priority Data

Apr. 5, 2013 (JP) ................... 2013-079630

(51) Int. Cl.
*H02M 3/335* (2006.01)
*G03G 15/00* (2006.01)
*H02M 1/00* (2006.01)

(52) U.S. Cl.
CPC ....... *H02M 3/33523* (2013.01); *G03G 15/5004* (2013.01); *G03G 15/80* (2013.01); *H02M 2001/0035* (2013.01); *Y02B 70/16* (2013.01)

(58) Field of Classification Search
CPC ............ H02M 3/335; H02M 3/33523; H02M 2001/0035; G03G 15/5004; G03G 15/80
See application file for complete search history.

(56) References Cited

U.S. PATENT DOCUMENTS

| 5,689,407 | A | * | 11/1997 | Marinus ............ H02M 3/33523 363/21.12 |
| 7,023,679 | B2 | * | 4/2006 | Tomiyama .......... H02M 3/3385 361/91.1 |
| 8,503,197 | B2 | | 8/2013 | Hayasaki et al. |
| 2012/0025630 | A1 | * | 2/2012 | Tsuda ................ G03G 15/5004 307/125 |
| 2014/0043869 | A1 | | 2/2014 | Hirabayashi |
| 2014/0368742 | A1 | * | 12/2014 | Joo ..................... H02M 1/4208 348/730 |

FOREIGN PATENT DOCUMENTS

| JP | 2004-260977 A | 9/2004 |
| JP | 2007-215359 A | 8/2007 |
| JP | 2010-142071 A | 6/2010 |

* cited by examiner

*Primary Examiner* — Matthew Nguyen
(74) *Attorney, Agent, or Firm* — Fitzpatrick, Cella, Harper & Scinto (57) ABSTRACT

The power supply apparatus includes a transformer having a primary side and a secondary side insulated from each other, a switch element for switching current flowing in the primary side of the transformer, a control part configured to control an operation of the switch element, and two feedback parts configured to detect an output voltage from the transformer so as to output, to the control part, a detection signal in accordance with the output voltage for feedback to the primary side of the transformer.

10 Claims, 8 Drawing Sheets

POWER SUPPLY APPARATUS AND IMAGE FORMING APPARATUS

BACKGROUND OF THE INVENTION

1. Field of the Invention

The present invention relates to a power supply apparatus and an image forming apparatus including the power supply apparatus.

2. Description of the Related Art

A power supply apparatus configured to output a necessary DC voltage to be used in electronic equipment is installed in various types of electronic equipment and is widely used. Electronic equipment nowadays is required to reduce power consumption in a standby mode. For this purpose, there are employed various methods for reducing power consumption in the power supply apparatus, too. For instance, in Japanese Patent Application Laid-Open No. 2010-142071, there is proposed a method in which an output voltage of a power supply circuit is lowered in the standby mode in which a load on the electronic equipment is reduced, and an oscillation period of the power supply circuit is increased so as to improve efficiency and reduce power consumption of the power supply apparatus. Japanese Patent Application Laid-Open No. 2010-142071 introduces some power supply circuits. In particular, the power supply circuit proposed in the first embodiment has a small modification from a related-art circuit structure and is easy to realize. However, in an actual power supply circuit, a protection circuit is combined in many cases as a measure against breakdown. For instance, Japanese Patent Application Laid-Open No. 2004-260977 proposes a power supply circuit in which a sub-loop (sub-feedback loop) circuit is added as the protection circuit besides the feedback loop circuit that is normally used for controlling the output voltage. In this power supply circuit, even when the feedback loop circuit, which is normally used, is broken down to be a loop open state, the sub-loop circuit as the protection circuit operates so as to safely control the output voltage.

Figure 8:
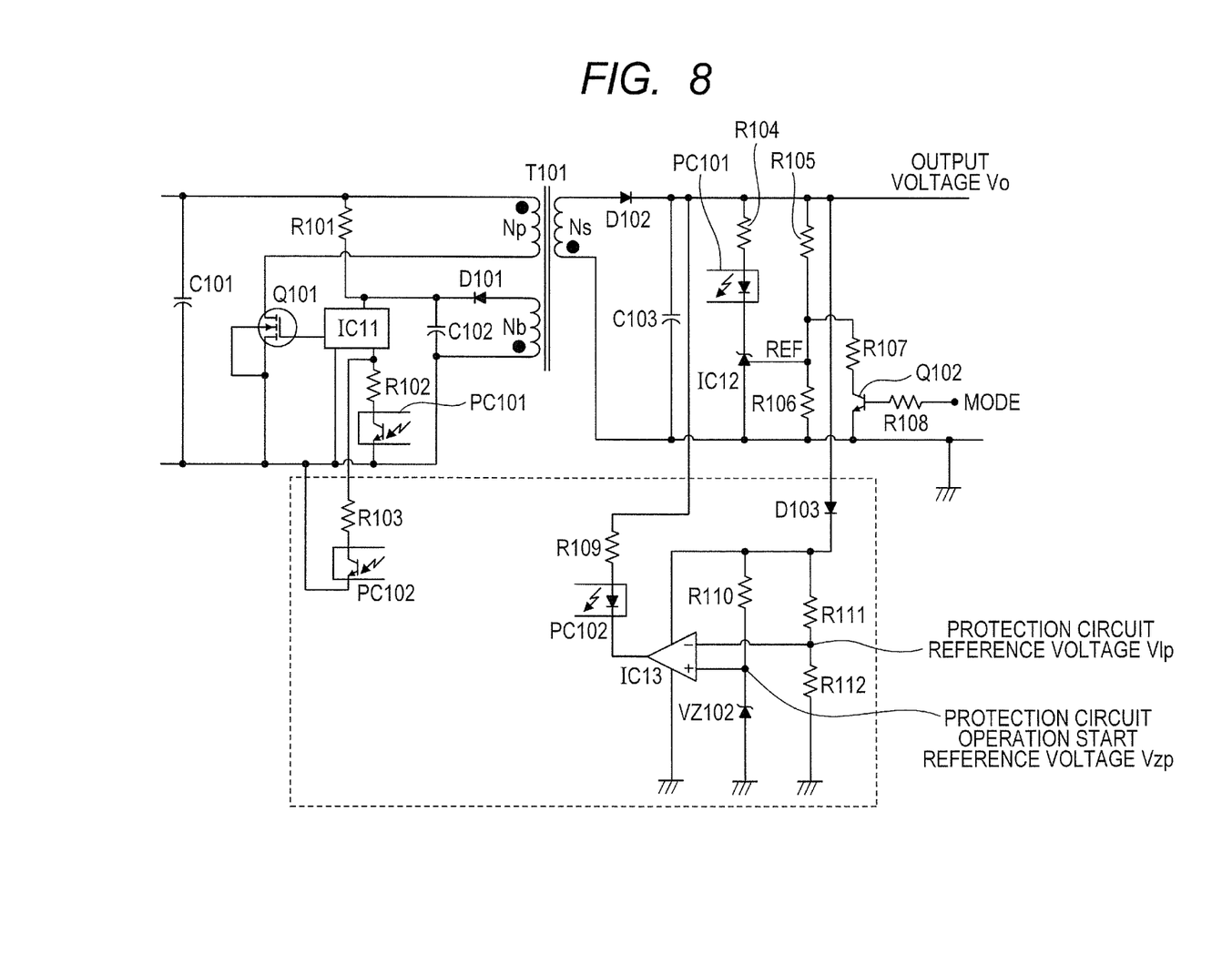
FIG. 8 is a circuit diagram in which an overvoltage protection circuit is added to a power supply circuit of a related-art power supply apparatus.

FIG. 8 illustrates a circuit diagram incorporating a sub-loop control circuit of an AC-DC converter illustrated in FIG. 1 of Japanese Patent Application Laid-Open No. 2004-260977 into a primary to secondary conversion part of a circuit of a power supply apparatus illustrated in FIG. 1 of Japanese Patent Application Laid-Open No. 2010-142071, so as to correspond to an actual power supply circuit. A part enclosed by a broken line in FIG. 8 is the sub-loop control circuit of Japanese Patent Application Laid-Open No. 2004-260977, and the remaining circuit is the circuit of the primary to secondary conversion part of Japanese Patent Application Laid-Open No. 2010-142071. Here, operation of the circuit of FIG. 8 is described only briefly, and detailed description of FIG. 8 is given later. The circuit of the primary to secondary conversion part performs the following operation. Specifically, a shunt regulator IC12 having a reference voltage inside controls a light emission amount of an LED part of a photocoupler PC101 based on a voltage value that is obtained by dividing an output voltage Vo by resistors R105 and R106 and is input to a REF terminal. Further, a power supply IC11 controls switching of an FET Q101 based on the current amount flowing in a phototransistor part corresponding to the light emission amount of the LED part of the photocoupler PC101, so as to stabilize the output voltage Vo.

In addition, the sub-loop control circuit as an overvoltage protection circuit enclosed by the broken line performs the following operation. Specifically, a comparator IC13 compares a protection circuit operation start reference voltage Vzp generated by a zener diode VZ102 with a protection circuit reference voltage Vlp obtained by dividing the output voltage Vo by resistors R111 and R112. In the case of Vlp>Vzp, the comparator IC13 outputs a low level signal, an LED part of a photocoupler PC102 is turned on, a phototransistor part becomes conductive, and the power supply IC11 suppresses oscillation of the primary side of a transformer T101 so as to drop the output voltage Vo. In contrast, in the case of Vlp<Vzp, an output of the comparator IC13 becomes a high impedance state, the LED part of the photocoupler PC102 is turned off, the phototransistor part is turned off, oscillation of the primary side of the transformer T101 is restarted so as to raise the output voltage Vo again. This operation is repeated so that the output voltage Vo is maintained at a constant voltage. Further, a division ratio of the resistors R111 and R112 is set so that Vlp>Vzp holds when the output voltage Vo rises up to a voltage value at which a protection operation is required to be started, and hence it is possible to prevent the output voltage Vo from rising further. In this way, by providing an additional control circuit having no common component with the control circuit that is normally used, the power supply circuit can be protected more safely.

However, when the power supply circuit has the circuit structure as illustrated in FIG. 8, the following problems occur. As a first problem, when the feedback circuit (primary to secondary conversion part) that is normally used maintains the normal condition until end of use of the product (until being discarded), the control circuit enclosed by the broken line becomes a redundant feedback circuit that is not used. As a second problem, a diode D103 is disposed in the power supply circuit in order to test operation of the overvoltage protection circuit enclosed by the broken line in a delivery inspection of the circuit substrate. However, the diode D103 is a circuit element for preventing backflow current to other system when an overvoltage is applied for testing operation in the delivery inspection, and is not used except for the operation test in the delivery inspection. As a third problem, when the overvoltage protection circuit becomes out of order after the delivery inspection of the product due to a certain reason such as an impact in transportation or assembling, a user cannot notice the fact. As a result, when the product is used continuously without noticing that the overvoltage protection circuit is out of order, and when the control circuit that is normally used also becomes out of order, there is substantially no protection circuit. As a fourth problem, a circuit including a transistor Q102 and resistors R107 and R108 so as to switch the output voltage Vo is disposed at the REF terminal part of the shunt regulator IC12 as the feedback circuit (in a current path of the resistors R105 and R106). This part is the most important part for determining the accuracy of the output voltage of the power supply circuit, and variations of components used in this part significantly affect a variation of the output voltage when the product is mass-produced. When an output voltage switching circuit is disposed at the part, the increase of the number of components becomes an increase of factors of the variation. As a result, a variation of the output voltage Vo may be increased.

SUMMARY OF THE INVENTION

The present invention has been made in view of the situation described above, and the present invention enables monitoring of both a feedback circuit that is normally used and a spare feedback circuit for troubleshooting.

In order to solve the problems described above, the present invention is configured as follows.

According to one embodiment of the present invention, there is provided a power supply apparatus, including: a transformer having a primary side and a secondary side insulated from the primary side; a switch element for switching current flowing in the primary side of the transformer; a control part configured to control an operation of the switch element so as to control an output voltage of the secondary side of the transformer; and a first feedback part and a second feedback part configured to detect the output voltage from the secondary side of the transformer so as to output, to the control part, a detection signal in accordance with the detected output voltage for feedback to the primary side of the transformer, in which a second target voltage in the second feedback part is capable of being set to one of a first voltage higher than a first target voltage in the first feedback part and a second voltage lower than the first target voltage.

Further, according to one embodiment of the present invention, there is provided an image forming apparatus, including: an image forming unit for forming an image; a power supply for supplying electric power to the image forming unit; the power supply including: a transformer having a primary side and a secondary side insulated from the primary side; a switch element for switching current flowing in the primary side of the transformer; a control part configured to control an operation of the switch element so as to control an output voltage of the secondary side of the transformer; and a first feedback part and a second feedback part configured to detect the output voltage from the secondary side of the transformer so as to output, to the control part, a detection signal in accordance with the detected output voltage for feedback to the primary side of the transformer, in which a second target voltage in the second feedback part is capable of being set to one of a first voltage higher than a first target voltage in the first feedback part and a second voltage lower than the first target voltage.

Further features of the present invention will become apparent from the following description of exemplary embodiments with reference to the attached drawings.

DESCRIPTION OF THE EMBODIMENTS

Now, embodiments of the present invention are described in detail.

General Outline of Related-Art Power Supply Circuit

First, for comparison to embodiments described later, a description is made on a structure and operation of a circuit in which an overvoltage protection circuit is added to a related-art power supply circuit of a power supply apparatus with reference to FIG. 8. FIG. 8 is a circuit diagram illustrating a structure of the related-art power supply circuit including the overvoltage protection circuit enclosed by a broken line. Note that, in FIG. 8, a commercial AC power supply and an input part of an AC voltage including a bridge diode and the like for rectifying the AC voltage are omitted.

(Circuit Structure)

In FIG. 8, the power supply circuit includes a smoothing capacitor C101, a start-up resistor R101, a field effect transistor (FET) Q101 as a switch element, a power supply IC11 for controlling power supply, a transformer T101, a diode D101, and a capacitor C102. In addition, the power supply circuit includes a secondary rectifying diode D102, a secondary smoothing capacitor C103, resistors R102, R104, R105, and R106, and a shunt regulator IC12 as a first feedback unit. An LED part of a photocoupler PC101 is disposed on the secondary side of the transformer T101, and a phototransistor part of the photocoupler PC101 is disposed on the primary side of the transformer T101. The phototransistor part is connected to the power supply IC11 via the resistor R102. In addition, a resistor R107 is connected to a collector terminal of a transistor Q102, one end of a resistor R108 is connected to a base terminal of the transistor Q102, and the other end thereof is connected to a MODE terminal, so as to form an output voltage changing circuit. The transformer T101 for insulating between the primary side and the secondary side has an auxiliary winding Nb besides a primary winding Np and a secondary winding Ns. The secondary winding Ns has a winding direction opposite to that of the primary winding Np (to have a so-called flyback coupling). In addition, the auxiliary winding Nb also has the winding direction opposite to that of the primary winding Np (to have the so-called flyback coupling). The power supply apparatus including the power supply circuit illustrated in FIG. 8 has two states including a normal mode and a standby mode as an energy-saving mode in accordance with a state of equipment in which the power supply apparatus is mounted. The two states can be switched by a signal from the MODE terminal.

The overvoltage protection circuit enclosed by the broken line includes a comparator IC13 as a second feedback unit, a photocoupler PC102, a zener diode VZ102, a diode D103, and resistors R103, R109, R110, R111, and R112. A phototransistor part of the photocoupler PC102 is connected to the power supply IC11 via the resistor R103. One end of an LED part of the photocoupler PC102 is connected to a cathode side of the diode D102 via the resistor R109, and the other end thereof is connected to an output terminal of the comparator IC13.

(Circuit Operation)

In FIG. 8, when an AC voltage is applied from a commercial AC power supply (not shown), the capacitor C101 is charged with a voltage rectified by a diode bridge (not shown). When a voltage of the capacitor C101 rises, the power supply IC11 for power supply control is supplied with power via the start-up resistor R101, and hence the power supply IC11 turns on the FET Q101. When the FET Q101 is turned on, a current flows in the primary winding Np of the transformer T101, and voltages are also induced in the secondary winding Ns and the auxiliary winding Nb by the voltage applied to the winding Np of the transformer T101. The voltage induced in the auxiliary winding Nb is blocked by the diode D101 so that no current flows. Similarly, the voltage induced in the secondary winding Ns is blocked by the diode D102 so that no current flows. After a predetermined time determined by an inner circuit of the power supply IC11 elapses, the FET Q101 is turned off. Then, a voltage at a drain terminal of the FET Q101 of the primary winding Np rises. On the other hand, a current flows in the secondary winding Ns in such a direction as to charge the capacitor C103 via the diode D102 and charges the capacitor C103, and hence a voltage of the capacitor C103 rises. After a predetermined time determined by the inner circuit of the power supply IC11 elapses, the FET Q101 is turned on, and a current is supplied from the capacitor C101 to the transformer T101 again. When the FET Q101 is turned off by the power supply IC11 after a predetermined time, the voltage induced in the secondary winding Ns again charges the capacitor C103 via the diode D102 so that an output voltage Vo is output.

When the power supply apparatus is in the normal mode, a high level signal is input from the MODE terminal. With this, the transistor Q102 is turned on so that the resistor R107 is connected in parallel to the resistor R106. On the other hand, when the power supply apparatus is in the standby mode, a low level signal is input from the MODE terminal. With this, the transistor Q102 is turned off so that the resistor R107 is separated. As a result, an input voltage at a REF terminal of the shunt regulator IC12 in the normal mode is a voltage obtained by dividing the output voltage Vo by the resistor R105 and the parallel-connected resistors R106 and R107. On the other hand, the input voltage at the REF terminal in the standby mode is a voltage obtained by dividing the output voltage Vo only by the resistor R105 and the resistor R106. The shunt regulator IC12 compares its internal reference voltage with a voltage input to the REF terminal. Then, based on a result of the comparison, the shunt regulator IC12 controls a current value flowing in the LED part of the photocoupler PC101 as a first detection signal. In this way, a state of the output voltage Vo is transmitted to the power supply IC11 via the phototransistor part of the photocoupler PC101. With this, the power supply IC11 controls an on-time (on-duty) of the FET Q101 to control the output voltage Vo. Further, in accordance with a difference of the voltage input to the REF terminal, the power supply apparatus outputs the output voltage Vo that is lower in the standby mode than in the normal mode.

Next, an operation of the overvoltage protection circuit enclosed by the broken line is described. The phototransistor part of the photocoupler PC102 and the resistor R103 that are connected in series are connected in parallel to the similar serial connection of the phototransistor part of the photocoupler PC101 and the resistor R102. Then, when the phototransistor part of the photocoupler PC102 receives a signal from the LED part, the power supply IC11 operates so as to suppress oscillation of the power supply circuit similarly to the case where the phototransistor part of the photocoupler PC101 receives a signal from the LED part. In addition, a non-inverting input terminal (+) of the comparator IC13 is supplied with a reference voltage Vzp generated by the zener diode VZ102 for starting the operation of the overvoltage protection circuit. On the other hand, an inverting input terminal (−) of the comparator IC13 is supplied with a reference voltage Vlp of the overvoltage protection circuit obtained by dividing the output voltage Vo input via the diode D103 by the resistors R111 and R112. Then, the comparator IC13 compares the two input voltages Vlp and Vzp. When the reference voltage Vlp is higher than the reference voltage Vzp, a low level signal as a second detection signal is output. Then, the LED part of the photocoupler PC102 is supplied with current through the resistor R109 and to emit light, thereby turning on the phototransistor part of the photocoupler PC102 to input a signal to the power supply IC11. In this way, the power supply IC11 suppresses oscillation of the power supply circuit, and as a result, the output voltage Vo drops.

When the output voltage Vo drops so that the relationship between the reference voltage Vlp and the reference voltage Vzp becomes "reference voltage Vlp<reference voltage Vzp" again, the output of the comparator IC13 becomes a high impedance state. Then, a current does not flow in the LED part of the photocoupler PC102 so that the LED part is turned off, and hence the phototransistor part of the photocoupler PC102 is turned off. Therefore, the power supply IC11 restarts oscillation of the power supply circuit, and as a result, the output voltage Vo rises again. This operation is repeated so that the output voltage Vo is maintained at a constant voltage. Further, a division ratio of the resistor R111 and the resistor R112 is set so that the reference voltage Vlp is higher than the reference voltage Vzp when the output voltage Vo of the power supply circuit rises up to a target voltage that is a voltage at which the overvoltage protection operation is intended to be started. For instance, in a power supply circuit having a normal output voltage Vo of 24 V, the protection circuit is operated when the output voltage Vo exceeds 30 V. In this case, when a zener voltage of the zener diode VZ102 is 2.5 V, the resistor R111 is set to 110 kΩ while the resistor R112 is set to 10 kΩ. In this way, when the output voltage Vo is 30 V, the reference voltage Vlp is calculated as follows: Vlp=30 V×(10 kΩ/(10 kΩ+110 kΩ)=2.5 V. When the output voltage Vo is 30 V, the reference voltage Vlp is equal to the zener voltage of the zener diode VZ102 that is the reference voltage Vzp. Then, when the output voltage Vo further rises, the comparator IC13 outputs the low level signal so that the LED part of the photocoupler PC102 emits light, thereby turning on the phototransistor part. Thus, the power supply IC11 suppresses oscillation of the power supply circuit. In this way, it is possible to prevent the output voltage Vo from further rising.

First Embodiment

General Outline of Power Supply Circuit

Figure 1:
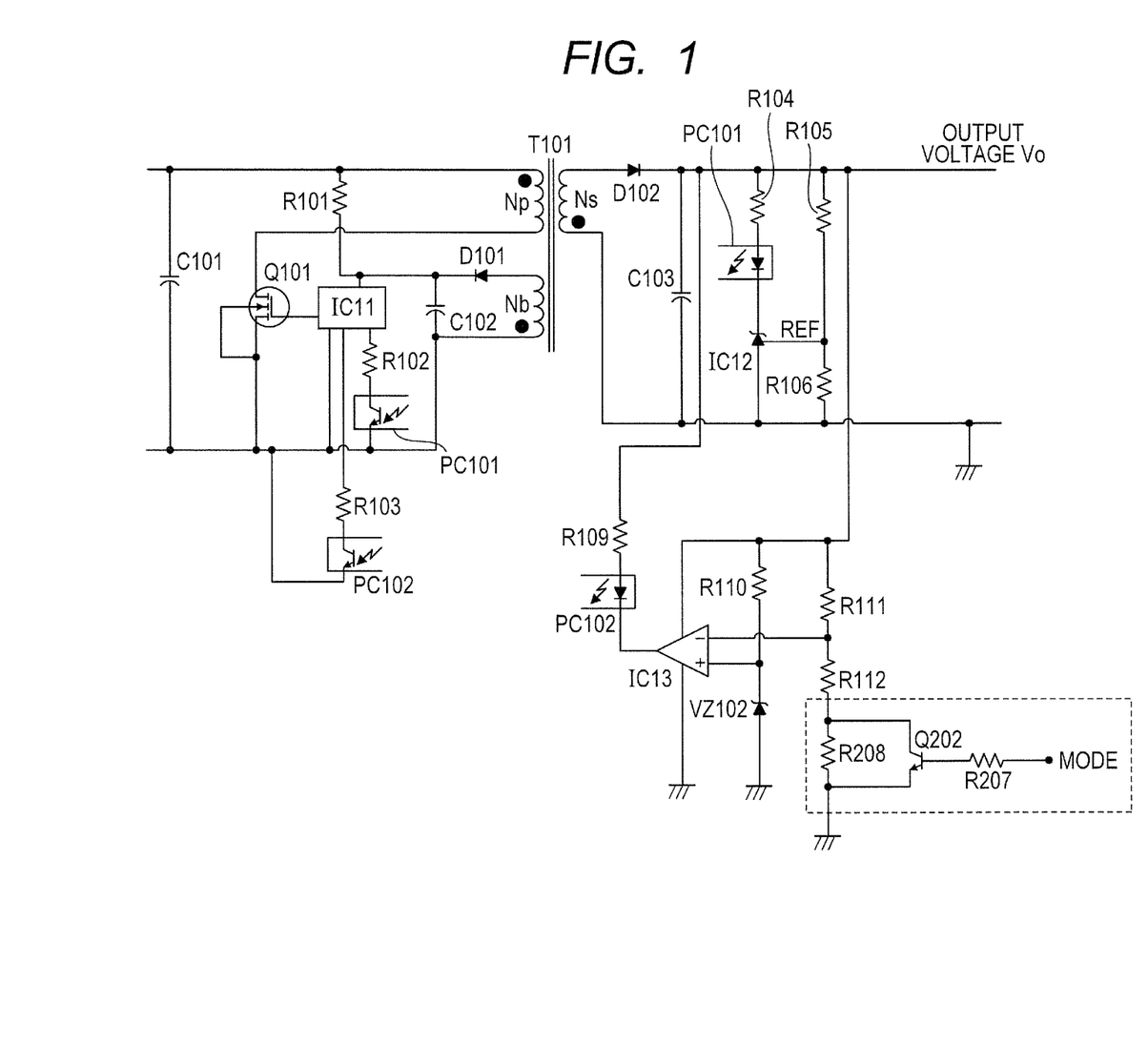
FIG. 1 is a circuit diagram of a power supply circuit of a power supply apparatus according to a first embodiment of the present invention.

FIG. 1 is a circuit diagram illustrating a circuit structure of a power supply circuit included in a power supply apparatus according to a first embodiment of the present invention. FIG. 1 is a circuit diagram in which the above-mentioned related-art power supply circuit illustrated in FIG. 8 is modified in accordance with this embodiment. The modified point is as follows. The output voltage changing circuit in FIG. 8, which changes the voltage input to the REF terminal of the shunt regulator IC12 by being connected in parallel to the resistor R106 when the input from the MODE terminal is the high level, is moved to a part enclosed by a broken line in FIG. 1, and the diode D103 is eliminated. Further, circuit elements enclosed by the broken line in FIG. 1 are the same as those in FIG. 8, but in order to show a difference from FIG. 8, the reference symbols thereof are changed as a transistor Q202, and resistors R207 and R208. Other circuit elements are the same as those in FIG. 8, and hence are denoted by the same reference symbols and overlapping descriptions are omitted.

By moving the output voltage changing circuit, influence of the feedback circuit mainly including the shunt regulator IC12 on accuracy of the output voltage becomes small, and hence a variation of the output voltage Vo in mass production of the power supply apparatus can be reduced. In the related art described above, the output voltage Vo is changed in accordance with a mode of the product, and the same is true for this embodiment. However, in the related art described above, the output of the shunt regulator IC12 constructing the feedback circuit is switched between the normal mode and the standby mode. Further, the output of the comparator IC13 constructing another feedback circuit is fixed without changing between the normal mode and the standby mode. On the contrary, in this embodiment, a control voltage as a first target voltage of the shunt regulator IC12 is fixed, while a control voltage as a second target voltage of the comparator IC13 can be switched and set between the normal mode and the standby mode. A difference between the two feedback circuits is whether the shunt regulator IC12 is used or the comparator IC13 is used. The shunt regulator IC12 adjusts a light amount of the LED part of the photocoupler PC101 in accordance with a voltage value of the output voltage Vo, and hence the power supply circuit illustrated in FIG. 1 can output the output voltage Vo with high accuracy and little ripple. Therefore, the shunt regulator IC12 is appropriately used for control in the normal mode with a load condition in which voltage accuracy is required.

On the other hand, the feedback circuit including the comparator IC13 is controlled by two values (two states) of on and off of the LED part of the photocoupler PC102, and therefore the power supply circuit operates intermittently. The intermittent operation of the power supply circuit increases the ripple or deteriorates the voltage accuracy, but contributes to a reduction of conduction noise, and an improvement of efficiency and power saving in light load. Therefore, it is considered that the feedback circuit including the comparator IC13 is appropriately used for control in the standby mode. Therefore, in the following description, the control of the feedback circuit including the shunt regulator IC12 is referred to as the normal mode, and the control of the feedback circuit including the comparator IC13 is referred to as the standby mode.

Next, set values of constants of the power supply circuit illustrated in FIG. 1 are described. In FIG. 1, when the high level signal is input from the MODE terminal so that the transistor Q202 is turned on, for example, the normal mode is set. Here, it is supposed that the internal reference voltage of the shunt regulator IC12 is 2.5 V. In this case, a resistance value of the resistor R105 as a first voltage dividing resistor is set to 105 kΩ, and a resistance value of the resistor R106 is set to 12 kΩ. With this, a voltage of approximately 24 V is output as the output voltage Vo by control of the feedback circuit including the shunt regulator IC12. In other words, when the output voltage Vo is 24 V, a voltage of 24 V×(12 kΩ/(105 kΩ+12 kΩ2))≈2.5 V is input to the REF terminal of the shunt regulator IC12.

On the other hand, when the low level signal is input from the MODE terminal so that the transistor Q202 is turned off, the standby mode is set. Here, it is supposed that the zener voltage of the zener diode VZ102 is 2.5 V. In this case, a resistance value of the resistor R111 is set to 110 kΩ, a resistance value of the resistor R112 is set to 10 kΩ, and a resistance value of the resistor R208 is set to 334 kΩ. Then, a voltage of approximately 3.3 V as a second voltage is output as the output voltage Vo by control of the comparator IC13. In the case of the standby mode, the inverting input terminal of the comparator IC13 is supplied with a voltage divided by the resistors R111, R112, and R208 that construct a second voltage dividing resistor. In other words, when the output voltage Vo is 3.3 V, the inverting input terminal of the comparator IC13 is supplied with a voltage of 3.3 V×((10 kΩ+334 kΩ)/(110 kΩ+10 kΩ+334 kΩ))≈2.5 V.

On the other hand, in the normal mode, the transistor Q202 is turned on, and hence the inverting input terminal of the comparator IC13 is supplied with a voltage divided by the resistors R111 and R112. When the zener voltage of the zener diode VZ102 is 2.5 V, the output voltage Vo at which the input voltage at the inverting input terminal as the control voltage of the comparator IC13 becomes approximately 2.5 V can be calculated from Vo×(10 kW (110 kΩ+10 kΩ))≈2.5 V. In this case, the output voltage Vo is calculated to be approximately 30 V. As a result, the first voltage as the control voltage of the comparator IC13 in the normal mode is 30 V, and hence the comparator IC13 has a role of the overvoltage protection circuit for the shunt regulator IC12 that controls the output voltage Vo at approximately 24 V. On the contrary, in the standby mode, the shunt regulator IC12 in which the control voltage remains to be approximately 24 V has a role of the overvoltage protection circuit for the comparator IC13 that controls the output voltage Vo at approximately 3.3 V. In other words, the two feedback circuits play roles of a main control circuit and the overvoltage protection circuit for each other in accordance with the normal mode or the standby mode. This is a feature of this embodiment. In the delivery inspection, by confirming that the circuit operation is normal in the normal mode and in the standby mode, it can be also confirmed that the overvoltage protection is normally performed. Further, the necessity of adding the diode D103 is eliminated, which is a component for inspecting the protection circuit and is used only in the delivery inspection of the product. In addition, in the case where one of the feedback circuits breaks down after the product is shipped, the mode cannot be changed to the normal mode or the standby mode, and hence it is possible to inform the user of the breakdown when a controller such as a CPU in electronic equipment has a function capable of detecting the breakdown.

As described above, according to this embodiment, it is possible to monitor both the feedback circuit that is normally used and the spare feedback circuit for troubleshooting. In particular, according to this embodiment, a system of the overvoltage protection circuit is changed from a stand-by redundancy system including only the comparator to a parallel redundancy system including the comparator and the shunt regulator. With this, a waste of components can be eliminated while the user can be informed when one of the feedback circuits breaks down. Therefore, it is possible to reduce the possibility that the operation is performed in the state where the other feedback circuit breaks down as well, to thereby improve safety of the power supply circuit and the power supply apparatus including the power supply circuit. In addition, because the output voltage changing circuit is eliminated from the feedback circuit including the shunt regulator that requires accuracy of the output voltage, a variation of the output voltage in mass production of the power supply apparatus can be reduced. Further, in the delivery inspection, it is possible to check whether both the feedback circuits are normal by checking whether a predetermined output voltage is output in the normal mode and in the standby mode. Therefore, the necessity of adding a component for inspecting the protection circuit, which is used only in the delivery inspection of the product, can be eliminated. Thus, the inspection time and cost can be reduced.

Second Embodiment

General Outline of Power Supply Circuit

Figure 2:
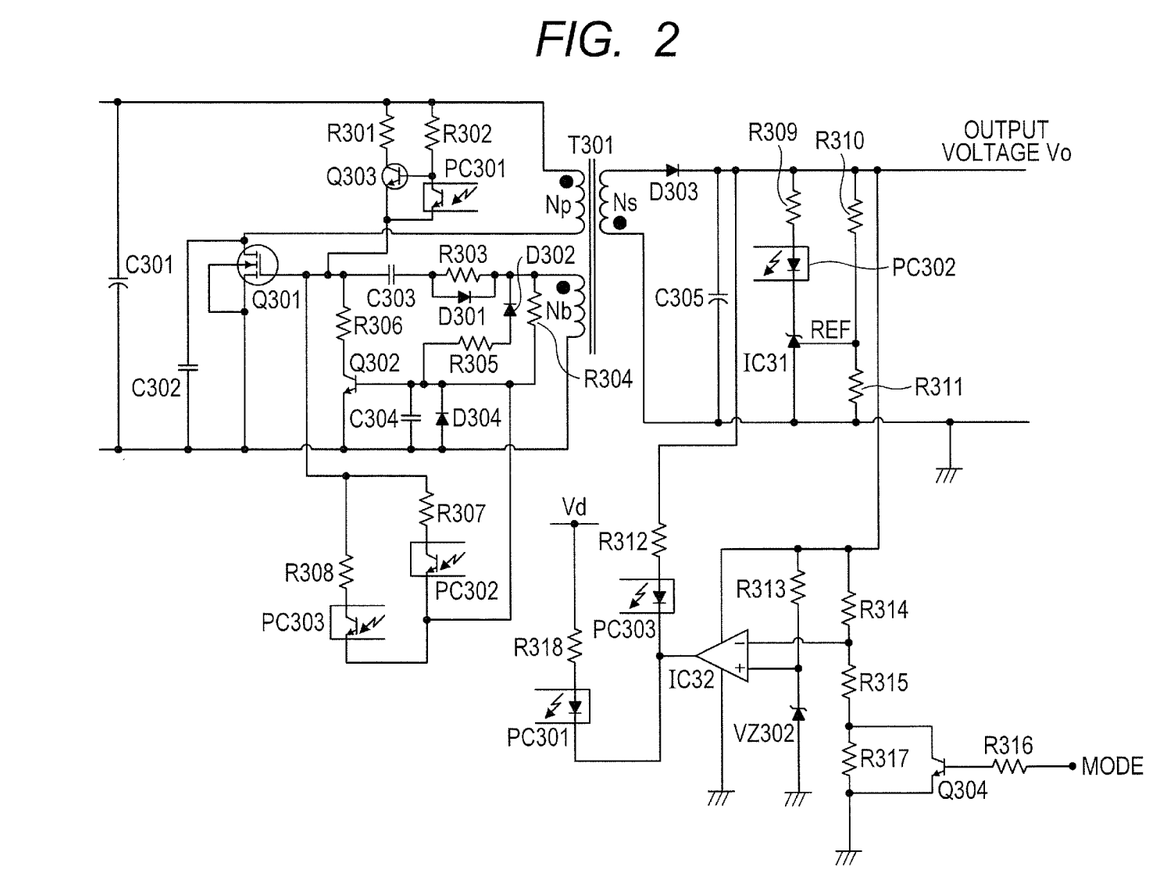
FIG. 2 is a circuit diagram of a power supply circuit of a power supply apparatus according to a second embodiment of the present invention.

FIG. 2 is a circuit diagram illustrating a circuit structure of a power supply circuit included in a power supply apparatus according to a second embodiment of the present invention. FIG. 2 illustrates an example in which the circuit of the first embodiment illustrated in FIG. 1 is applied to a ringing choke converter (RCC) that is a self-exciting converter. In FIG. 2, a peripheral circuit of the power supply IC11 in FIG. 1 is different, but a circuit on the secondary side of a transformer T301 is substantially the same as that in FIG. 1. Although FIG. 2 illustrates the circuit similar to that in FIG. 1, circuit elements of FIG. 2 are denoted by new reference symbols. In addition, a difference from FIG. 1 is that only the start-up resistor R101 is disposed in FIG. 1, but two start-up resistors R301 and R302 are disposed in FIG. 2, and a photocoupler PC301 controls the connection switching of the start-up resistors. In the following description, with reference to FIG. 2, the circuit structure and operation in this embodiment are described.

(Circuit Structure)

In FIG. 2, the power supply circuit includes an electrolytic capacitor C301 (hereinafter referred to as capacitor C301), the transformer T301, the first start-up resistor R301, the second start-up resistor R302, and the photocoupler PC301. Note that, a resistance value of the start-up resistor R302 is larger than that of the start-up resistor R301. Further, the power supply circuit includes an FET Q301, transistors Q302 and Q303, resistors R303, R304, R305, R306, R307, and R308, and capacitors C302, C303, and C304. Further, the power supply circuit includes photocouplers PC302 and PC303 and diodes D301, D302, and D304.

Further, the power supply circuit includes a secondary rectifying diode D303, an electrolytic capacitor C305 (hereinafter referred to as capacitor C305), resistors R309, R310, and R311, and a shunt regulator IC31. Further, the power supply circuit includes resistors R312, R313, R314, R315, R316, R317, and R318, a comparator IC32, a transistor Q304, and a zener diode VZ302 for generating a reference voltage. Note that, in FIG. 2, a voltage Vd is a voltage system (not shown), and it is assumed to be a direct-current voltage having a voltage value less than Vo that is generated from the output voltage Vo.

(Circuit Operation)

In FIG. 2, when an AC voltage is applied from a commercial AC power supply (not shown), the capacitor C301 is charged with a voltage rectified by a diode bridge (not shown) so that a voltage of the capacitor C301 rises. Immediately after the power supply circuit is activated, because the output voltage Vo has not risen, an LED part of the photocoupler PC301 does not emit light. As a result, a phototransistor part of the photocoupler PC301 is turned off. Therefore, a current due to the start-up resistor R302 flows between the base and emitter of the transistor Q303 so that the transistor Q303 is turned on. As a result, a current flows in the start-up resistor R301 on a current path from the capacitor C301 to the FET Q301 so that a voltage is applied to a gate terminal of the FET Q301 to turn on the FET Q301. When the FET Q301 is turned on, a current starts to flow in the primary winding Np of the transformer T301. Then, a voltage is generated in the auxiliary winding Nb of the transformer T301 in a direction of further raising the voltage at the gate terminal of the FET Q301. This voltage charges the capacitor C304 through the resistor R304. A voltage across the capacitor C304 is also applied between the base and emitter of the transistor Q302. Therefore, when a predetermined time elapses after charging of the capacitor C304 is started, a base voltage sufficient for turning on the transistor Q302 is generated, and hence the transistor Q302 is turned on.

When the transistor Q302 is turned on, the FET Q301 is turned off so that a voltage between drain and source terminals starts to rise. As a result, a voltage of the auxiliary winding Nb on the cathode side of the diode D302 drops so that a voltage in the opposite direction is generated.

When the FET Q301 is turned off, a current flows in the secondary winding Ns in a direction in which the diode D303 conducts. When the voltage becomes higher than a sum of a voltage of the capacitor C305 and a forward voltage of the diode D303, the capacitor C305 is charged. Simultaneously, the voltage induced in the auxiliary winding Nb discharges the capacitor C304. The diode D304 is connected for protection so that a voltage higher than a reverse withstanding voltage is not applied between the base and emitter of the transistor Q302. The resistor R305 and the diode D302 are connected so as to cause a current to flow in a direction of discharging the capacitor C304 at a higher rate than discharge due to the resistor R304. In order to turn off the FET Q301 at a higher rate, the diode D301 is connected in parallel to the resistor R303.

During the off period of the FET Q301, energy stored in the transformer T301 is stored in the capacitor C305 while a current flowing in the secondary winding Ns decreases along time. When the energy discharge from the secondary winding Ns is finished, voltages having opposite polarities, namely so-called flyback voltages are generated in all the windings of the transformer T301. In this way, the output voltage of the auxiliary winding Nb also becomes a voltage having an opposite polarity, and a voltage of the auxiliary winding Nb on the anode terminal side of the diode D304 also drops. Then, a gate terminal voltage of the FET Q301 is biased by a current flowing through the start-up resistor R301 so as to rise.

When the gate terminal voltage of the FET Q301 becomes higher than a threshold value, the FET Q301 is turned on, and a current flows in the primary winding Np in a direction from a positive terminal of the capacitor C301 through the transformer T301 and the FET Q301 to a negative terminal of the capacitor C301. In addition, because the voltage is induced in the auxiliary winding Nb so that a current flows, the gate terminal voltage of the FET Q301 further rises. As described above, the capacitor C304 is charged by the voltage of the auxiliary winding Nb through the resistor R304, and hence the transistor Q302 is turned on to turn off the FET Q301.

The sequential oscillation operation as described above is repeated, and energy stored in the transformer T301 during the on period of the FET Q301 is stored in the capacitor C305 during the off period of the FET Q301 so that the voltage across the capacitor C305 rises.

The voltage across the capacitor C305 is divided by the resistors R310 and R311. When a voltage across the resistor R311 becomes higher than a reference voltage of the shunt regulator IC31, the shunt regulator IC31 starts to cause a current to flow so that an LED part of the photocoupler PC302 emits light.

A phototransistor part of the photocoupler PC302 is connected to the resistor R307 and the base terminal of the transistor Q302. When the LED part of the photocoupler PC302 emits light, the phototransistor part is turned on. The shunt regulator IC31 controls a current flowing in the LED part of the photocoupler PC302 in accordance with a difference between the reference voltage and the voltage at the REF terminal, and hence the output voltage Vo as the voltage across the capacitor C305 is controlled to be the reference voltage.

In the normal mode, the comparator IC32 operates as the overvoltage protection circuit as described above. Therefore, when the output voltage Vo is a normal voltage, the output of the comparator IC32 is in a high impedance state, and hence the LED part of the photocoupler PC301 does not emit light. Therefore, in the normal mode, a current flows in the start-up resistor R301.

On the other hand, in the standby mode, the low level signal is input from the MODE terminal to turn off the transistor Q304, and hence the comparator IC32 becomes the control circuit for the output voltage Vo and the shunt regulator IC31 becomes the overvoltage protection circuit. Therefore, the output of the comparator IC32 can control emission of the LED parts of the photocouplers PC301 and PC303.

An inverting input terminal (−) of the comparator IC32 is supplied with a voltage obtained by dividing the output voltage Vo by the resistors R314, R315, and R317. In addition, a non-inverting input terminal (+) of the comparator IC32 is supplied with a zener voltage of the zener diode VZ302 biased through the resistor R313. The comparator IC32 compares the voltages input to the two input terminals. When the input voltage at the inverting input terminal is higher than the input voltage at the non-inverting input terminal, a low level signal is output. When the comparator IC32 outputs the low level signal, an LED part of the photocoupler PC303 emits light. As a result, a phototransistor part of the photocoupler PC303 is turned on. Then, the transistor Q302 is turned on, and the FET Q301 is turned off. Further, when the comparator IC32 outputs the low level signal, the LED part of the photocoupler PC301 also emits light. Then, the phototransistor part of the photocoupler PC301 is turned on, and the transistor Q303 is turned off. Because the start-up resistor R302 has a larger resistance value than that of the start-up resistor R301, the gate terminal voltage of the FET Q301 drops so that the FET Q301 cannot be turned on.

In the above, the structure and operation of the circuit illustrated in FIG. 2 are described, which are similar to those in FIG. 1 including the photocouplers PC101 and PC102 in that the LED parts of the photocouplers PC302 and PC303 in FIG. 2 emit light to stop oscillation on the primary side of the transformer T301. As described above, the basic circuit operation in FIG. 2 is the same as that in FIG. 1, but has a problem of the RCC in that a stationary loss due to a current constantly flowing from the capacitor C301 to the start-up resistor, which is a cause of efficiency degradation. Therefore, in this embodiment, the start-up resistor switching circuit is adopted so as to further reduce power consumption in the standby mode. Specifically, when the comparator IC32 outputs the low level signal in the standby mode, the LED part of the photocoupler PC303 emits light to stop oscillation of the power supply circuit. Further, the LED part of the photocoupler PC301 emits light simultaneously so as to switch to the start-up resistor R302 having a higher resistance value between the two start-up resistors R301 and R302. In this way, the stationary loss due to the start-up resistor during stop of the oscillation is suppressed.

As described above, according to this embodiment, it is possible to monitor both the feedback circuit that is normally used and the spare feedback circuit for troubleshooting. Further, in this embodiment, it is possible to suppress the stationary loss due to the start-up resistor.

Third Embodiment

General Outline Of Power Supply Circuit

Figure 3:
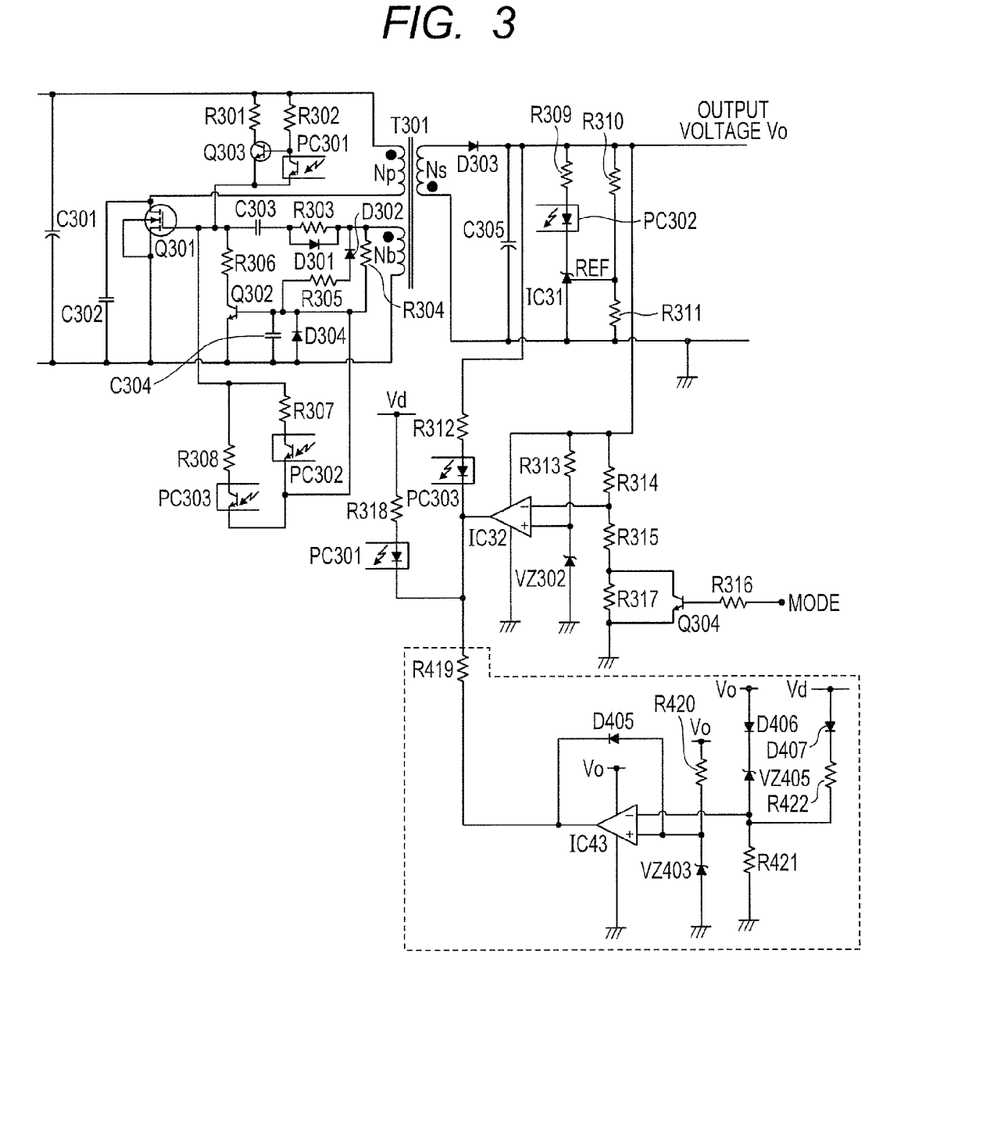
FIG. 3 is a circuit diagram of a power supply circuit of a power supply apparatus according to a third embodiment of the present invention.

FIG. 3 is a circuit diagram illustrating a circuit structure of a power supply circuit included in a power supply apparatus according to a third embodiment of the present invention. FIG. 3 is a circuit diagram in which an independent overvoltage protection circuit enclosed by a broken line is further added to the circuit illustrated in FIG. 2 that is the power supply circuit of the second embodiment. As described above, in order to obtain higher safety of the basic power supply circuit, it is necessary to add the protection circuit. Further, it is desired that the protection circuit to be added be a protection circuit that maintains the output voltage Vo at a voltage lower than the normal output voltage after detecting the overvoltage. Therefore, in this embodiment, this function is realized by adding a third protection circuit that works as a third detection part enclosed by the broken line in FIG. 3. The circuit enclosed by the broken line in FIG. 3 added in this embodiment includes a comparator IC43, zener diodes VZ403 and VZ405, diodes D405, D406, and D407, and resistors R419, R420, R421, and R422. In FIG. 3, it is supposed that the voltage Vd is a voltage system (not shown) and is a DC voltage equal to or lower than the voltage Vo generated from the output voltage Vo.

In the circuit enclosed by the broken line, when the output voltage Vo exceeds a predetermined value determined by zener voltages of the zener diodes VZ405 and VZ403, the comparator IC43 outputs the low level signal. Then, when the LED part of the photocoupler PC303 emits light to turn on the phototransistor part, the transistor Q302 is turned on, and the FET Q301 is turned off. In addition, when the output of the comparator IC43 becomes low level, an input potential at the non-inverting input terminal (+) of the comparator IC43 is lowered through the diode D405 so that the low level output of the comparator IC43 is maintained. Even when the output voltage Vo becomes lower than the zener voltage of the zener diode VZ405 so that a current does not flow through the diode D406, a current flows through the diode D407 and the resistor R422. Therefore, the state where an input potential at an inverting input terminal (−) of the comparator IC43 is higher than the input potential at the non-inverting input terminal (+) is maintained, and hence the low level output of the comparator IC43 is maintained. Thus, the output voltage Vo can be maintained at low level when an abnormality occurs.

This embodiment can enhance safety more than the second embodiment by the effect of the drooping type overvoltage protection circuit. For instance, in the case of the power supply circuit that normally outputs the output voltage Vo of approximately 24 V, an operation start voltage of the drooping type overvoltage protection circuit enclosed by the broken line is set to approximately 28 V, and an operation start voltage of the overvoltage protection circuit in the feedback loop on the comparator IC32 side is set to approximately 30 V. In this way, a double safety system is realized. Specifically, the power supply circuit basically has safety in that the output voltage Vo drops to a low voltage when an abnormality occurs, and even when the overvoltage protection circuit enclosed by the broken line also breaks down, the output voltage Vo does not become approximately 30 V or higher.

As described above, according to this embodiment, it is possible to monitor both the feedback circuit that is normally used and the spare feedback circuit for troubleshooting.

Fourth Embodiment

General Outline of Power Supply Circuit

Figure 4:
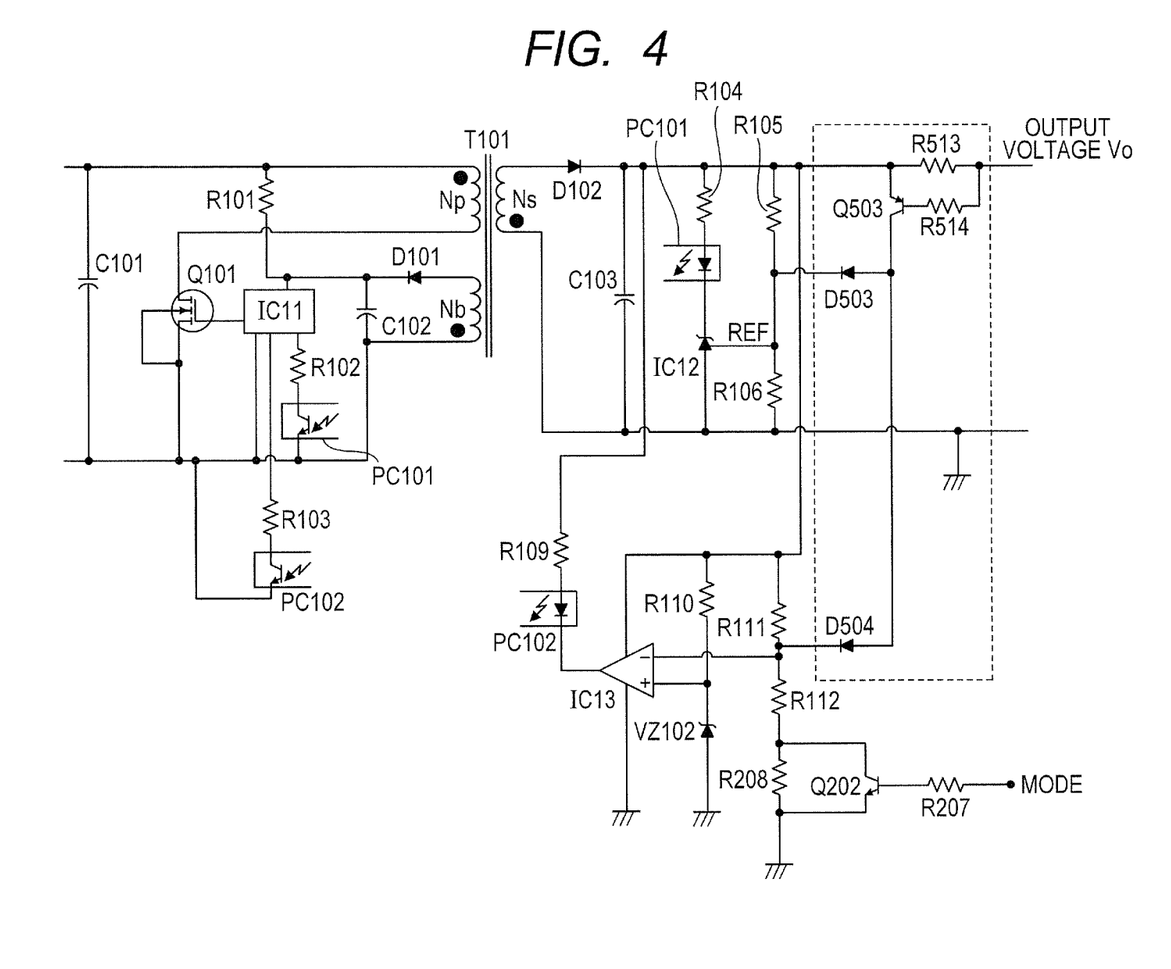
FIG. 4 is a circuit diagram of a power supply circuit of a power supply apparatus according to a fourth embodiment of the present invention.

FIG. 4 is a circuit diagram illustrating a circuit structure of a power supply circuit included in a power supply apparatus according to a fourth embodiment of the present invention. FIG. 4 is a circuit diagram in which a circuit having an overcurrent protection function, which is enclosed by a broken line, is added to the circuit illustrated in FIG. 1 that is the power supply circuit of the first embodiment. The circuit enclosed by the broken line added in this embodiment includes a PNP type transistor Q503, a current detecting resistor R513, a resistor R514, and diodes D503 and D504. The current detecting resistor R513 operates to convert the output current into a voltage and to generate a potential difference between the base and emitter of the PNP type transistor Q503. When a voltage generated by a current flowing in the resistor R513 becomes an operation voltage Vbe of the transistor Q503 or higher, the transistor Q503 is turned on. Thus, a current flowing in the resistor R106 and the resistors R112 and R208 increases so that the input voltage at the REF terminal of the shunt regulator IC12 and the input voltage at the inverting input terminal (−) of the comparator IC13 rise. As a result, the power supply IC11 suppresses oscillation of the power supply circuit based on the feedback signal input to the power supply IC11 via the photocouplers PC101 and PC102. For instance, in the case where a resistance value of the resistor R513 is 0.3Ω, when a current flowing in the resistor R513 becomes approximately 2 A, a voltage of approximately 0.6 V is generated across the resistor R513 so that a potential difference between the base and emitter becomes 0.6 V, and hence the transistor Q503 is turned on. Then, the input voltage at the REF terminal of the shunt regulator IC12 and the input voltage at the inverting input terminal (−) of the comparator IC13 rise. In this case, when the output voltage is controlled by the shunt regulator IC12, oscillation of the power supply circuit is suppressed by the shunt regulator IC12 so that the output voltage drops. In addition, under control of the comparator IC13, oscillation of the power supply circuit is stopped by the comparator IC13 so that the output voltage drops.

As described above, according to this embodiment, it is possible to monitor both the feedback circuit that is normally used and the spare feedback circuit for troubleshooting. Further, in this embodiment, when an overcurrent is detected, oscillation is suppressed so that safety of the apparatus can be secured.

Fifth Embodiment

General Outline of Power Supply Circuit

Figure 5:
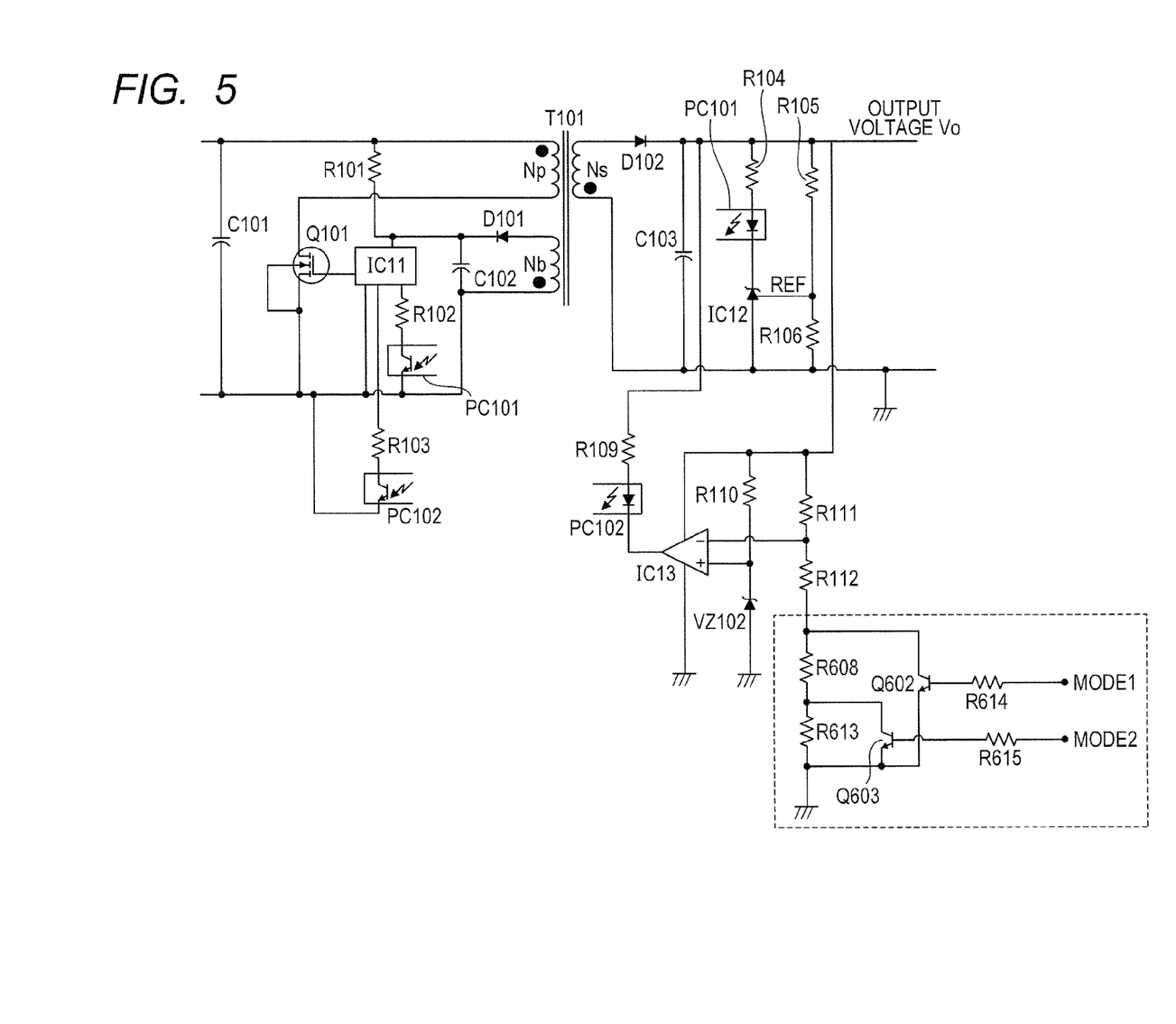
FIG. 5 is a circuit diagram of a power supply circuit of a power supply apparatus according to a fifth embodiment of the present invention.

FIG. 5 is a circuit diagram illustrating a circuit structure of a power supply circuit included in a power supply apparatus according to a fifth embodiment of the present invention. FIG. 5 is a circuit diagram in which the circuit enclosed by the broken line is added to the circuit illustrated in FIG. 1 that is the power supply circuit of the first embodiment. In setting of the constants of the circuit described above in the first embodiment, the control voltage of the feedback circuit including the comparator IC13 is two output voltages of approximately 3.3 V and approximately 30 V. In this embodiment, by adding the circuit enclosed by the broken line, the output voltage that is two types in the first embodiment can be increased to be three types. The circuit enclosed by the broken line added in this embodiment includes transistors Q602 and Q603, and resistors R608, R613, R614, and R615. In addition, a MODE1 terminal and a MODE2 terminal for outputting signals to the transistors Q602 and Q603 are disposed via the resistors R614 and 615.

In FIG. 5 of this embodiment, a resistance value of the resistor R111 is set to 110 kΩ, a resistance value of the resistor R112 is set to 10 kΩ, a resistance value of the resistor R608 is set to 12 kΩ, a resistance value of the resistor R613 is set to 322 kΩ, and a zener voltage of the zener diode VZ102 is set to 2.5 V.

In accordance with signal levels of the MODE1 terminal and the MODE2 terminal, combinations of voltage dividing resistors for dividing the output voltage Vo input to the inverting input terminal (−) of the comparator IC13, and the control voltage of the comparator IC13 in that case are determined as follows. When both the MODE1 terminal and the MODE2 terminal output the low level signals, the transistors Q602 and Q603 are turned off, and hence the voltage dividing resistors are R111, R112, R608, and R613. In this case, the output voltage Vo as the control voltage is calculated from Vo×((10 kΩ+12 kΩ+322 kΩ)/(110 kΩ+10 kΩ+12 kΩ+322 kΩ))=2.5 V, and the control voltage is approximately 3.3 V. Next, when the MODE1 terminal outputs the high level signal while the MODE2 terminal outputs the low level signal, the transistor Q602 is turned on while the transistor Q603 is turned off, and hence the voltage dividing resistors are R111 and R112. In this case, the output voltage Vo as the control voltage is calculated from Vo×(10 kΩ/(110 kΩ+10 kΩ))=2.5 V, and the control voltage is approximately 30 V. Next, when the MODE1 terminal outputs the low level signal while the MODE2 terminal outputs the high level signal, the transistor Q602 is turned off while the transistor Q603 is turned on, and hence the voltage dividing resistors are R111, R112, and R608. In this case, the output voltage Vo as the control voltage is calculated from Vo×((10 kΩ+12 kΩ)/(110 kΩ+10 kΩ+12 kΩ)=2.5 V, and the control voltage as a third voltage is approximately 15 V.

Because the control voltage for the feedback circuit including the shunt regulator IC12 is constant as approximately 24 V, priority is put on power saving and hence the output voltage Vo is set to 3.3 V in the standby mode as a power supply off mode in which the electronic equipment does not need a high voltage, for example. In addition, in the standby mode that needs a certain level of the output voltage and power saving, the output voltage Vo is set to 15 V. Further, in the normal mode as an actual operation mode in which the output voltage of approximately 24 V is required and ripple of the output voltage and voltage accuracy are important, the output voltage is set to 24 V by control of the shunt regulator IC12. Further, in this case, when the shunt regulator IC12 breaks down, the output voltage can be controlled to be approximately 30 V by the comparator IC13.

As described above, according to this embodiment, it is possible to monitor both the feedback circuit that is normally used and the spare feedback circuit for troubleshooting. Further, in this embodiment, the types of the output voltage can be increased.

Sixth Embodiment

General Outline of Power Supply Circuit

Figure 6:
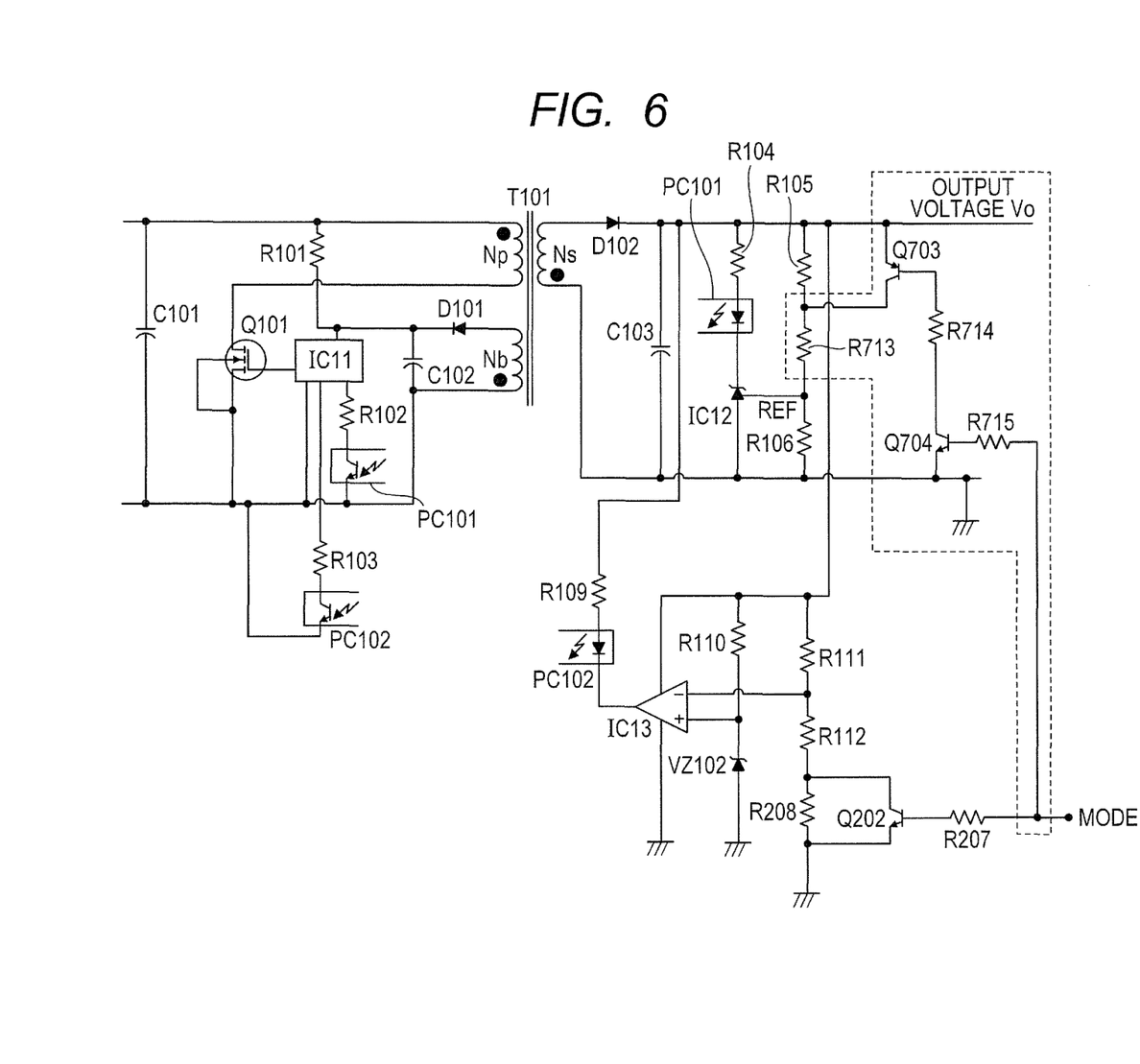
FIG. 6 is a circuit diagram of a power supply circuit of a power supply apparatus according to a sixth embodiment of the present invention.

FIG. 6 is a circuit diagram illustrating a circuit structure of a power supply circuit included in a power supply apparatus according to a sixth embodiment of the present invention. FIG. 6 is a circuit diagram in which a circuit enclosed by a broken line is added to the circuit of FIG. 1 that is the power supply circuit of the first embodiment. By adding the circuit enclosed by the broken line, it is possible to prevent the change of the operation start voltage for the overvoltage protection, whose value changes in the first embodiment between the normal mode of 30 V and the standby mode of 24 V.

The circuit enclosed by the broken line added in this embodiment includes transistors Q703 and Q704, and resistors R713, R714, and R715. A base terminal of the transistor Q704 is supplied with a signal from the MODE terminal through the resistor R715. In the normal mode, the high level signal is input from the MODE terminal, the transistor Q704 is turned on, and further the PNP type transistor Q703 is turned on. As a result, the REF terminal of the shunt regulator IC12 is supplied with a voltage obtained by dividing the output voltage Vo by the resistors R713 and R106. On the other hand, in the standby mode, the low level signal is input from the MODE terminal, the transistor Q704 is turned off, and the transistor Q703 also is turned off as well. As a result, the REF terminal of the shunt regulator IC12 is supplied with a voltage obtained by dividing the output voltage Vo by the resistors R105, R713, and R106.

In FIG. 6, for example, the zener voltage of the zener diode VZ102 is set to 2.5 V, the resistance value of the resistor R111 is set to 110 kΩ, the resistance value of the resistor R112 is set to 10 kΩ, and the resistance value of the resistor R208 is set to 334 kΩ. The internal reference voltage of the shunt regulator IC12 is set to 2.5 V, the resistance value of the resistor R105 is set to 27 kΩ, the resistance value of the resistor R713 is set to 105 kΩ, and the resistance value of the resistor R106 is set to 12 kΩ.

As described above in the first embodiment, in the normal mode, the shunt regulator IC12 plays a role as the main control circuit for controlling the output voltage Vo, and the comparator IC13 plays a role as the overvoltage protection circuit. On the other hand, in the standby mode, the comparator IC13 plays a role as the main control circuit for controlling the output voltage Vo, and the shunt regulator IC12 plays a role as the overvoltage protection circuit.

In the normal mode, the output voltage Vo controlled by the shunt regulator IC12 is calculated from Vo×(R106/(R713+R106))=Vo×(12 kΩ/(105 kΩ+12 kΩ)=2.5 V, and the output voltage Vo is approximately 24 V. Further, a control start voltage of the comparator IC13 is similarly calculated from Vo×(R112/(R111+R112))=Vo×(10 kΩ/(110 kΩ+10 kΩ))=2.5 V and the control start voltage is 30 V.

In addition, in the standby mode, the output voltage Vo controlled by the comparator IC13 can be calculated from Vo×((R112+R208)/(R111+R112+R208))=Vo×((10 kΩ+334 kΩ)/(110 kΩ+10 kΩ+334 kΩ))=2.5 V. In this case, the output voltage Vo controlled by the comparator IC13 is approximately 3.3 V. Further, a control start voltage of the shunt regulator IC12 is similarly calculated from Vo×(R106/(R105+R713+R106))=Vo×(12 kΩ/(27 kΩ+105 kΩ+12 kΩ))=2.5 V, and the control start voltage is 30 V. In this way, by setting the control start voltage for the overvoltage protection to approximately 30 V both in the normal mode and in the standby mode, the output voltage Vo in an abnormality can be made the same, and hence it is possible to reduce types of the output voltage Vo to be assumed as abnormal in design.

As described above, according to this embodiment, it is possible to monitor both the feedback circuit that is normally used and the spare feedback circuit for troubleshooting.

Seventh Embodiment

The power supply apparatus described in the first to sixth embodiments can be used as a low voltage power supply, for example, of an image forming apparatus, namely, a power supply for supplying electric power to the controller (control part) or a drive part such as a motor. In the following description, a structure of the image forming apparatus using the power supply apparatus of the first to sixth embodiments is described.

Structure of Image Forming Apparatus

Figure 7:
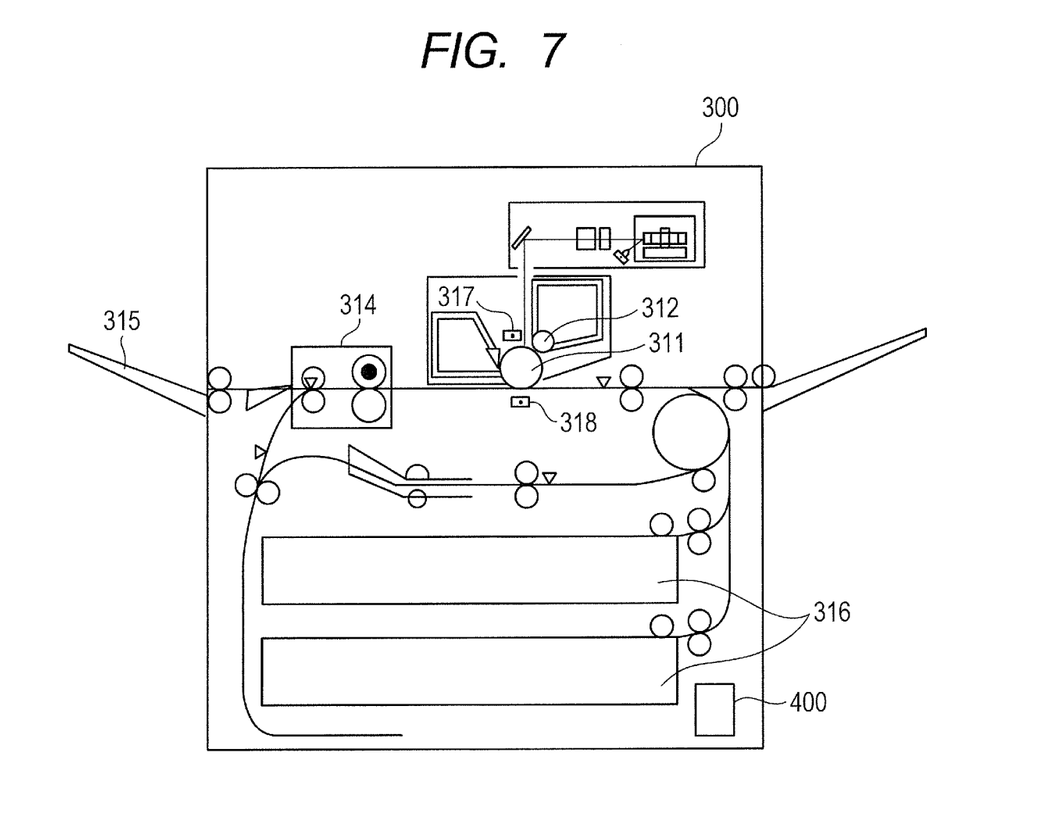
FIG. 7 is a diagram illustrating a schematic structure of a laser beam printer according to a seventh embodiment of the present invention.

As an example of the image forming apparatus, a laser beam printer is exemplified for description. FIG. 7 illustrates a schematic structure of the laser beam printer as an example of an electrophotographic printer. A laser beam printer 300 includes a photosensitive drum 311 as an image bearing member on which an electrostatic latent image is to be formed, a charge part 317 (charge unit) for uniformly charging the photosensitive drum 311, and a developing part 312 (developing unit) for developing the electrostatic latent image formed on the photosensitive drum 311 with toner. Further, a toner image developed on the photosensitive drum 311 is transferred onto a recording material (not shown) fed from a cassette 316 by a transfer part 318 (transfer unit). The toner image transferred onto the recording material is fixed by a fixing unit 314, and the recording material is discharged to a tray 315. The photosensitive drum 311, the charge part 317, the developing part 312, and the transfer part 318 serve as an image forming unit. In addition, the laser beam printer 300 includes a power supply apparatus 400 described above in the first to sixth embodiments. Further, the image forming apparatus to which the power supply apparatus of the first to sixth embodiments can be applied is not limited to that exemplified in FIG. 7. For instance, the image forming apparatus may include multiple image forming units. Further, the image forming apparatus may include a primary transfer part for transferring the toner image on the photosensitive drum 311 onto an intermediate transfer belt, and a secondary transfer part for transferring the toner image on the intermediate transfer belt onto the recording material.

The laser beam printer 300 includes a controller (not shown) for controlling an image forming operation performed by the image forming unit and an operation of conveying the recording material. The power supply apparatus described in the first to sixth embodiments supplies electric power to the controller, for example. In addition, the power supply apparatus described in the first to sixth embodiments supplies electric power to a drive part such as a motor for rotating the photosensitive drum 311 or driving various rollers for conveying the recording material, or to a fixing device for heating and fixing the toner image onto the recording material. The image forming apparatus of this embodiment can reduce power consumption by decreasing the output voltage by supplying electric power only to the controller, for example, in a standby state for realizing power saving (for example, in a power saving mode or the standby mode).

As described above, according to this embodiment, it is possible to monitor both the feedback circuit that is normally used and the spare feedback circuit for troubleshooting.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-079630, filed Apr. 5, 2013, which is hereby incorporated by reference herein in its entirety.

What is claimed is:
1. A power supply apparatus, comprising:
a transformer having a primary side and a secondary side insulated from the primary side;
a switch element for switching current flowing in the primary side of the transformer;
a control part configured to control an operation of the switch element so as to control an output voltage of the secondary side of the transformer; and a first detection part configured to detect the output voltage from the secondary side of the transformer and to supply the control part a first signal in accordance with the detected output voltage, a second detection part configured to compare an output value according to the output voltage on the secondary side of the transformer and a threshold value and supply a second signal based on a result of the comparison to the control part, the second detection part configured to switch an output condition of the secondary signal according to an external signal;

wherein in a case where a target value of the output voltage on the secondary side of the transformer is a first target voltage, the control part controls the switching of the switch element according to the first signal detected by the first detection part, and in the case where a target value of the output voltage on the secondary side of the transformer is lower than a second target voltage lower than the first target voltage, the control part controls the switching of the switch element according to the second signal detected by the second detection part.

2. A power supply apparatus according to claim 1, wherein the power supply is switchable between a normal mode and an energy-saving mode according to the external signal, wherein in the normal mode, overvoltage is detected in accordance with the second signal; and in the energy-saving mode, overvoltage is detected in accordance with the first signal.

3. A power supply apparatus according to claim 1, wherein the second detection part is capable of switching the second target voltage between the first voltage and the second voltage according to the external signal.

4. A power supply apparatus according to claim 1, further comprising a first start-up resistor and a second start-up resistor that are disposed in a current path to the switch element, the second start-up resistor having a larger resistance value than the first start-up resistor, in the normal mode, current is supplied to the switch element through the first start-up resistor, and in the energy-saving mode, the current is supplied to the switch element through the first start-up resistor and the second start-up resistor according to the second signal.

5. A power supply apparatus according to claim 1, further comprising a current detection unit configured to detect output current of the secondary side of the transformer so as to output a detection signal in accordance with the detected current, wherein the control part stops the operation of the switch element based on the detection signal from the current detection unit.

6. A power supply apparatus according to claim 1, wherein the control part stops the operation of the switch element based on the detection signal from each of the first detection part and the second detection part.

7. A power supply apparatus according to claim 1, wherein the first detection part includes a shunt regulator.

8. A power supply apparatus according to claim 1, wherein the second detection part includes a comparator.

9. An image forming apparatus, comprising:

an image forming unit for forming an image; and a power supply for supplying electric power to the image forming unit, wherein the power supply comprises:

a transformer having a primary side and a secondary side insulated from the primary side;

a switch element for switching current flowing in the primary side of the transformer;

a control part configured to control an operation of the switch element so as to control an output voltage of the secondary side of the transformer; and a first detection part configured to detect the output voltage from the secondary side of the transformer and to supply the control part a first signal in accordance with the detected output voltage, a second detection part configured to compare an output value according to the output voltage on the secondary side of the transformer and a threshold value and supply a second signal based on a result of the comparison to the control part, the second detection part configured to switch an output condition of the secondary signal according to an external signal;

wherein in a case where a target value of the output voltage on the secondary side of the transformer is a first target voltage, the control part controls the switching of the switch element according to the first signal detected by the first detection part, and in the case where a target value of the output voltage on the secondary side of the transformer is lower than a second target voltage lower than the first target voltage, the control part controls the switching of the switch element according to the second signal detected by the second detection part.

10. An image forming apparatus according to claim 9, further comprising an image formation control part configured to control an operation of the image forming unit, wherein the power supply supplies electric power to the image formation control part.

* * * * *